US007510766B2

(12) United States Patent
Lemieux

(10) Patent No.: US 7,510,766 B2
(45) Date of Patent: Mar. 31, 2009

(54) HIGH PERFORMANCE MAGNETIC COMPOSITE FOR AC APPLICATIONS AND A PROCESS FOR MANUFACTURING THE SAME

(75) Inventor: Patrick Lemieux, Ste-Julie (CA)

(73) Assignee: Corporation Imfine Inc., Quebec (CA)

( * ) Notice: Subject to any disclaimer, the term of this patent is extended or adjusted under 35 U.S.C. 154(b) by 257 days.

(21) Appl. No.: 10/544,851

(22) PCT Filed: Feb. 4, 2004

(86) PCT No.: PCT/CA2004/000147

§ 371 (c)(1), (2), (4) Date: Dec. 5, 2005

(87) PCT Pub. No.: WO2004/070745

PCT Pub. Date: Aug. 19, 2004

(65) Prior Publication Data

US 2006/0124464 A1 Jun. 15, 2006

(30) Foreign Application Priority Data

Feb. 5, 2003 (CA) .................................... 2418497

(51) Int. Cl.
*B32B 5/16* (2006.01)
*B05D 7/00* (2006.01)

(52) U.S. Cl. ........................ 428/403; 428/570; 427/215; 427/216; 427/217; 427/372.2

(58) Field of Classification Search ................. 427/212, 427/215, 216, 217, 372.2; 428/403, 570
See application file for complete search history.

(56) References Cited

U.S. PATENT DOCUMENTS 421,067 A 2/1890 Currie (Continued)

FOREIGN PATENT DOCUMENTS

EP 0 088 992 A2 9/1983

(Continued)

OTHER PUBLICATIONS

Gelinas et al., "Effect of Curing Conditions on Properties of Iron-Resin Materials for Low Frequency AC Magnetic Applications," Metal Powder Industries Federation, Advances in Powder Metallurgy & Particulate Materials, vol. 2, parts 5-9, pp. 8.3-8.11, (Jun. 1999).

*Primary Examiner*—H. T Le
(74) *Attorney, Agent, or Firm*—Darby & Darby PC

(57) ABSTRACT

A magnetic composite for AC applications with improved magnetic properties (i.e. low hysteresis losses and low eddy current losses) is disclosed. The composite comprises a consolidation of magnetizable metallic microlamellar particles each having a top and bottom surfaces and opposite ends. The top and bottom surfaces are coated with a dielectric coating for increasing the resistivity of the composite and reducing eddy current losses. The dielectric coating is made of a refractory material and the ends of the lamellar particles are metallurgically bonded to each other to reduce hysteresis losses of the composite. A process for manufacturing the same is also disclosed. The composite is suitable for manufacturing devices for AC applications such as transformers, stator and rotor of motors, generators, alternators, field concentrators, chokes, relays, electromechanical actuators, synchroresolvers, etc.

38 Claims, 4 Drawing Sheets

U.S. PATENT DOCUMENTS

| | | | | | |
|---|---|---|---|---|---|
| 1,651,958 | A | * | 12/1927 | Lowry | 148/104 |
| 1,669,642 | A | * | 5/1928 | Andrews | 148/104 |
| 1,669,649 | A | | 5/1928 | Beath et al. | |
| 1,789,477 | A | | 1/1931 | Roseby | |
| 1,850,181 | A | | 3/1932 | Roseby | |
| 1,859,067 | A | | 5/1932 | Beath et al. | |
| 1,878,589 | A | | 9/1932 | Marris et al. | |
| 2,230,228 | A | | 2/1941 | Bandur | |
| 2,330,590 | A | | 9/1943 | Kaschke | |
| 2,783,208 | A | | 2/1957 | Katz | |
| 2,937,964 | A | | 5/1960 | Adams et al. | |
| 3,215,966 | A | * | 11/1965 | Lord, Jr. et al. | 336/211 |
| 3,255,052 | A | | 6/1966 | Opitz | |
| 3,271,718 | A | * | 9/1966 | Shaw | 428/220 |
| 3,695,945 | A | * | 10/1972 | Benz | 419/42 |
| 3,848,331 | A | | 11/1974 | Pavlik et al. | |
| 4,158,561 | A | * | 6/1979 | Pavlik et al. | 148/105 |
| 4,158,580 | A | | 6/1979 | Reynolds et al. | |
| 4,158,581 | A | | 6/1979 | Krause et al. | |
| 4,158,582 | A | | 6/1979 | Krause | |
| 4,265,681 | A | | 5/1981 | Krause et al. | |
| 4,543,208 | A | | 9/1985 | Horie et al. | |
| 4,601,765 | A | | 7/1986 | Soileau et al. | |
| 4,602,957 | A | | 7/1986 | Pollock et al. | |
| 4,919,734 | A | * | 4/1990 | Ochiai et al. | 148/306 |
| 5,063,011 | A | | 11/1991 | Rutz et al. | |
| 5,211,896 | A | | 5/1993 | Ward et al. | |
| 5,238,507 | A | | 8/1993 | Kugimiya et al. | |
| 5,350,628 | A | | 9/1994 | Kugimiya et al. | |
| 5,352,522 | A | | 10/1994 | Kugimiya et al. | |
| 5,594,186 | A | | 1/1997 | Krause et al. | |
| 5,595,609 | A | | 1/1997 | Gay | |
| 5,754,936 | A | | 5/1998 | Jansson et al. | |
| 5,925,836 | A | | 7/1999 | Krause et al. | |
| 6,117,205 | A | | 9/2000 | Krause et al. | |
| 6,193,903 | B1 | | 2/2001 | Gay et al. | |
| 6,251,514 | B1 | | 6/2001 | Lashmore et al. | |
| 6,331,270 | B1 | | 12/2001 | Lefebvre et al. | |
| 6,548,012 | B2 | | 4/2003 | Lefebvre et al. | |

FOREIGN PATENT DOCUMENTS

| | | | |
|---|---|---|---|
| EP | 0401835 | | 12/1990 |
| EP | 0 950 455 | A1 | 10/1999 |
| GB | 805710 | | 12/1958 |
| WO | 02/058865 | | 8/2002 |

* cited by examiner

HIGH PERFORMANCE MAGNETIC COMPOSITE FOR AC APPLICATIONS AND A PROCESS FOR MANUFACTURING THE SAME

FIELD OF THE INVENTION

The present invention relates generally to the field of magnetic materials, more specifically to soft or temporary magnetic composites for AC applications and to the production of the same. More particularly, it concerns a soft magnetic composite with reduced hysteresis and eddy current losses and very good mechanical properties. The magnetic composite of the invention is well suited for manufacturing power application devices such as stator or rotor of machines or parts of relays operating at frequencies up to 10 000 Hz; or chokes, inductors or transformers for frequencies up to 10 000 Hz.

BACKGROUND OF THE INVENTION

Magnetic materials can be divided into two major classes: permanent magnetic materials (also referred to as hard magnetic materials) and temporary magnetic materials (also referred to as soft magnetic materials).

The permanent magnets are characterized by a large remanence, so that after removal of a magnetizing force, a high flux density remains. The permanent magnets tend toward large hysteresis loops, which are the closed curves showing the variation of the magnetic induction of a magnetic material with the external magnetic field producing it, when this field is changed through a complete cycle. Permanent magnets are commonly physically hard substances and are, therefore, called hard magnets.

The temporary or soft magnets have low values of remanence and small hysteresis loops. They are commonly physically softer than the hard magnets and are known as soft magnets. Ideally, the soft magnets should have large values of permeability (μ) up to a high saturated flux density. The value of the permeability (μ) is the ratio B/H, where H represents the applied magnetic field, or magnetic force, expressed in amperes per meter (A/M) and B is the magnetic flux density induced in the material, and it is expressed in teslas (one tesla being equal to one weber per meter square ($W/m^2$)).

Soft magnetic materials are usually for applications where they have to canalize a varying magnetic flux. They are conventionally used for manufacturing transformers, inductance for electronic circuits, magnetic screens, stator and rotor of motors, generators, alternators, field concentrators, synchro-resolver, etc. A soft magnetic material has to rapidly react to the small variations of an external inducing magnetic field, and that, without heating and without affecting the frequency of the external field.

Therefore, soft magnets are usually used with alternating currents, and for maximum efficiency, it is essential to minimize the energy losses associated with the changing electric field. The energy losses, or core losses, as they are sometimes called, result in conversion of electric energy to thermal energy. The losses are usually expressed in terms of watts/kg (W/kg) for a given flux density (in teslas) at a given frequency (in Hertz). There are two principal mechanisms by which energy or core losses occur. These are hysteresis losses and eddy current losses. Soft magnetic materials have to have a small hysteresis loop (a small coercive field $H_C$) and a high flux density (B) at saturation.

As well explained in U.S. Pat. No. 6,548,012, hysteresis losses are due to the energy dissipated by the wall domain movement and they are proportional to the frequency. They are influenced by the chemical composition and the structure of the material.

Eddy currents are induced when a magnetic field is exposed to an alternating magnetic field. These currents which travel normal to the direction of the magnetic flux lead to an energy loss through Joule (resistance) heating. Eddy current losses are expected to vary with the square of the frequency, and inversely with the resistivity. The relative importance of the eddy current losses thus depends on the electrical resistivity of the material.

In prior art, soft magnetic parts for alternative current of low and medium frequency applications (between 50 Hz and 50 000 Hz) have been produced using basically two different technologies, each having their advantages and limitations.

The first and widely used, since the end of the $19^{th}$ century, consists of punching and stacking steel laminations. This well-known process involves material loss since scrap material is generated from notches and edges of the laminations when stamping. This material loss could be very costly with some specific alloys. This process also requires a default free roll of material of dimensions greater than the dimensions of the part to be produced. The laminations have the final geometry or a subdivision of the final geometry of the parts and can be coated with an organic and/or inorganic insulating material. Every imperfection on the laminations like edges burr decreases the stacking factor of the final part and thus its maximum induction. Also, mass production of laminations prevents design with rounded edges to help copper wire winding. Due to the planar nature of the laminations, their use limits the design of devices with 2 dimensions distribution of the magnetic field. Indeed, the field is limited to travel only in the plane of the laminations.

The cost of the laminations is related to their thickness. To limit energy losses generated by eddy currents, as the magnetic field frequency of the application increases, laminations thickness must be decreased. This increases the rolling cost of the material and decreases the stacking factor of the final part due to imperfect surface finish of the laminations and burrs and the relative importance of the insulating coating. Laminations are thus well suited but limited to low frequency applications.

The second process for the production of soft magnetic parts for AC applications, well-known since the beginning of the 20th century, is a variant of the mass production powder metallurgy process where particles used are electrically isolated from each other by a coating (U.S. Pat. Nos. 421,067; 1,669,649; 1,789,477; 1,850,181; 1,859,067; 1,878,589; 2,330,590; 2,783,208; 4,543,208; 5,063,011; 5,211,896). To prevent the formation of electrical contacts between the powder particles, and thus to reduce the eddy current losses, the powder particles are not sintered for AC applications. Parts issued from this process are commonly named "soft magnetic composites or SMC". Obviously, this process has the advantage of eliminating material loss.

SMC are isotropic and thus offer the possibility of designing components which allow the magnetic fields to move in the three dimensions. SMC allow also the production of rounded edges with conventional powder metallurgy pressing techniques. As mentioned above, those rounded edges help winding the electric conductors. Due to the higher curvature radius of the rounded edges, the electrical conductors require less insulation. Furthermore, a reduction in the length of the conductors due to the rounded edges of the soft magnetic part is a great advantage, since it allows the amount of copper used to be minimized as well as the copper loss (loss due to the electrical resistivity of the electrical conductor carrying the current in the electromagnetic device).

With rounded edges, the overall dimension of the electrical component could be reduced, since electrical winding could be partially inlaid within the volume normally occupied by the soft magnetic part. In addition, due to the isotropy of the material and the gain of freedom of the pressing process, new designs that increase total yield, decrease the volume or the weight for the same power output of electric machines are possible, since a better distribution or movement of the magnetic field in the three dimensions is possible.

Another advantage of the powder metallurgy process is the elimination of the clamping mean needed to secure laminations together in the final part. With laminations, clamping is sometimes replaced by a welding of the edges of laminations. Using the later approach, the eddy currents are considerably increased, and the total yield of the device or its frequency range application is decreased.

The limitation of the SMC is their high hysteresis losses and low permeability compared to steel laminations. Since particles must be insulated from each other to limit eddy currents induction, there is a distributed air gap in the material that decreases significantly the magnetic permeability and increases the coercive field. Additionally, to prevent the destruction of the insulation or coating, SMC can very hardly be fully annealed or achieve a complete recrystallisation with grain coarsening. The temperatures reported for annealing SMC without loosing insulation are about 600° C. in a non-reducing atmosphere and with the use of partially or totally inorganic coating (U.S. Pat. Nos. 2,230,228; 4,601,765; 4,602,957; 5,595,609; 5,754,936; 6,251,514; 6,331,270 B1; PCT/SE96/00397). Although the annealing temperature commonly used is not sufficient to completely remove residual strain in the particles or to cause recrystallisation or grain growth, a substantial amelioration of the hysteresis losses is observed.

Ultimately, for all the soft magnetic composites with irregular or spherical particles developed for AC applications until now, even if residual strain would have been removed and grain growth would have been possible at temperatures used for the annealing cycle of finished parts, metallic grain dimension is limited to the size of the particles. This small grain size limits the possibility of increasing the permeability, decreasing the coercive field or simply, the hysteresis losses in the material. Indeed, the smaller the metallic grains are, the higher is the number of grain boundaries, and more energy is required for moving the magnetic domain walls and increasing the induction of the material in one direction. Therefore, the resulting total energy losses (or core losses) of SMC parts at low frequency (below 400 Hz) is greater than the total energy losses obtained with laminations. The low permeability values require also more copper wire to achieve the same induction or torque in the electromagnetic device. An optimized three dimensions and rounded winding edges design of the part made with the SMC with irregular or spherical particles can partially or completely compensate those higher hysteresis losses and low permeability values encountered with SMC material at low frequency.

Some attempts have been made to develop more performing inorganic coatings and processes for conventional soft magnetic composites that would allow a full annealing of compacts and even recrystallisation without losing too much electrical insulation between particles (U.S. Pat. Nos. 2,937,964; 5,352,522; EP 0 088 992 A2; WO 02/058865). These prior art documents teach a heat treatment at around 1000° C. or less to consolidate particles by the diffusion or interaction of the insulating material of each particle. In all these cases, the goal is to produce a soft magnetic composite with discontinuous, separated soft magnetic particles joined by a continuous electrical insulating medium. The DC magnetic properties (coercive field and maximum permeability) of the produced composite are far inferior to those of the main wrought soft magnetic constituting material in the form of lamination, and thus, hysteresis losses in an AC magnetic field are higher and the electrical current or the number of turns of copper wire required to reach the same torque must be higher. Properties of those composites are well suited for applications frequency above 10 KHz to 1 MHz. If power frequencies are targeted (US Patents EP 0 088 992 A2 and WO 02/058865), the design of the component must compensate for the lower permeability and higher hysteresis losses of the material.

Finally, some people who have discovered the benefit of using lamellar particles for doing soft magnetic components have developed coating able to sustain annealing temperature, that is to say temperatures which are high enough to remove the major part of the remaining strain in the parts (U.S. Pat. Nos. 3,255,052; 3,848,331; 4,158,580; 4,158,582; 4,265,681). Once again, magnetic properties and energetic losses in an AC magnetic field at frequencies under 400 Hz are not those reached with good lamination steel or silicon steel used commercially, since metallic diffusion between soft magnetic particles is avoided to keep high electrical resistivity in the composite.

Since all the actual soft magnetic composite are discontinuous metallic media, the mechanical strength of the material is limited to the strength of the insulating coating. When the material breaks, it is de-cohesion that occurs between metallic particles, in the organic or inorganic (vitrous/ceramic) coating. The mechanical behavior of the SMC is thus fragile with no possibility of plastic deformation and the strength is always far lower than that of metallurgically bonded materials. It is an important limitation of the SMC.

Also known in the prior art are the sintered iron non coated powder components currently used to make parts for DC magnetic applications. These sintered parts have low resistivity and are generally not used in AC applications. In the literature or patents, when sintering treatments (metal to metal) or metallic diffusion are involved, soft magnetic parts produced are for DC applications where eddy currents are not a concern (U.S. Pat. Nos. 4,158,581; 5,594,186; 5,925,836; 6,117,205 for example) or for non-magnetic applications like structural parts.

SUMMARY OF THE INVENTION

An object of the present invention is to provide a magnetic composite for AC application, having improved magnetic properties (i.e. lower hysteresis and eddy current losses).

In accordance with the present invention, this object is achieved with a magnetic composite for AC applications, comprising a consolidation of magnetizable metallic micro-lamellar particles each having top and bottom surfaces and opposite ends. The top and bottom surfaces are coated with a dielectric coating for increasing the resistivity of the composite and reducing eddy current losses. The composite is characterized in that the coating is made of a refractory material and the ends of the lamellar particles are metallurgically bonded to each other to reduce hysteresis losses of the composite.

By metallurgically bonded, it is meant a metallic joint involving a metallic diffusion between the particles, obtained by sintering or forging or any other process allowing a metallic diffusion between the particles. In accordance with a first preferred embodiment, the metallurgically bonded ends are obtained by heating the consolidation of particles to a temperature of at least 800° C., more preferably, above 1000° C. In accordance with a second preferred embodiment, the metallurgically bonded ends are obtained by forging the consolidation.

By refractory material, it is meant a material capable of withstanding the effects of high temperature. Preferably, the coating is made of a material stable at a temperature of at least 1000° C.

The magnetic composite is preferably a soft magnetic composite having a coercive force of less than 500 A/m.

In order to increase the resistivity of the composite, and thus reduce its eddy current losses when it is under the effect of an alternating magnetic field, the coating is also dielectric. Since the dielectric material is a refractory, it prevents formation of metallic contacts (metallurgic bonds) between each top and bottom surfaces of particles during the thermal treatment and keep a certain electrical insulation. In that sense, this refractory material acts as a diffusion barrier for each top and bottom surfaces of particles. The sintering or metallurgical bonding is thus preferential.

The diffusion barrier or coating could be, for example, but it is not limited to, a metal oxide like silicon, titanium, aluminum, magnesium, zirconium, chromium, boron oxide and their combinations and all other oxides stable at a temperature above 1000° C. under a reducing atmosphere, of a thickness between 0.01 μm to 10 μm, more preferably between 0.05 μm and 2 μm. The microlamellar particles are preferably made of a metallic material containing at least one of Fe, Ni and CO. More preferably, they are made of a material selected from the group consisting of pure iron, iron alloys, pure nickel, nickel alloys, iron-nickel alloys, pure cobalt, cobalt alloys, iron-cobalt alloys and iron-nickel-cobalt alloys. Also preferably, the microlamellar particles have a thickness (e) in the range of 15 to 150 μm, and have a length-to-thickness ratio greater than 3 and lower than 200.

The magnetic composite according to the invention preferably has an energy loss when tested according to the ASTM standard A-773, A-927 for a toroïd of at least 4 mm thickness in an AC electromagnetic field of 1 Tesla and a frequency of 60 Hz of less than 2 W/kg.

Also preferably, the magnetic composite shows the following magnetic and mechanical properties:

- a coercive force of less than 100 A/m, preferably less than 50 A/m, and more preferably less than 25 A/m;
- a DC magnetic permeability of at least 1000, preferably at least 2500, and more preferably at least 5000;
- a transverse rupture strength of at least 125 MPa, preferably at least 500 MPa; and
- a plastic deformation zone like during mechanical testing (due to slow delamination of particles).

The present invention is also directed to a process of manufacturing a magnetic composite comprising the steps of:

a) providing microlamellar particles made of a magnetizable metallic material, the particles having opposite ends and a top and bottom surfaces, the top and bottom surfaces being coated with a dielectric and refractory coating;

b) compacting the microlamellar particles into a predetermined shape for obtaining a consolidation of the microlamellar particles; and c) metallurgically bonding the ends of the microlamellar particles to each other.

Preferably, step c) of metallurgically bonding comprises the step of: heating the consolidation at a temperature sufficient to sinter the ends of the microlamellar particles.

The temperature sufficient to sinter is preferably at least 800° C.; more preferably it is at least 1000° C.

Alternatively, step c) of metallurgically bonding comprises the step of: forging the consolidation.

The microlamellar particles are preferably obtained by:

a1) providing a foil of the magnetizable material having a thickness of less than about 150 μm, the foil having a top and bottom surface coated with the dielectric and refractory coating; and a2) cutting the microlamellar particles from the foil.

The diffusion barrier or coating material on the top and bottom surfaces of the microlamellar particles is obtained by a coating process adapted to produce a coating having a thickness of less than 10 μm. Preferably, it is made by a deposition technique (a physical vapor deposition (PVD) or chemical vapor deposition (CVD) process, plasma enhanced or not, or by dipping or spraying using a process such as the sol-gel process or the thermal decomposition of an oxide precursor, a surface reaction process (oxidation, phosphatation, salt bath reaction) or a combination of both (dipping the foil or particles into a liquid aluminum or magnesium bath, the CVD, PVD, Magnetron sputtering process of a pure metal coating and a chemical or thermo-chemical treatment to oxidize the coating formed during an additional step).

BRIEF DESCRIPTION OF THE DRAWINGS

Other objects and advantages of the invention will become apparent upon reading the following general and detailed description and upon referring to the drawings in which.

DESCRIPTION OF THE INVENTION

Figure 1A:
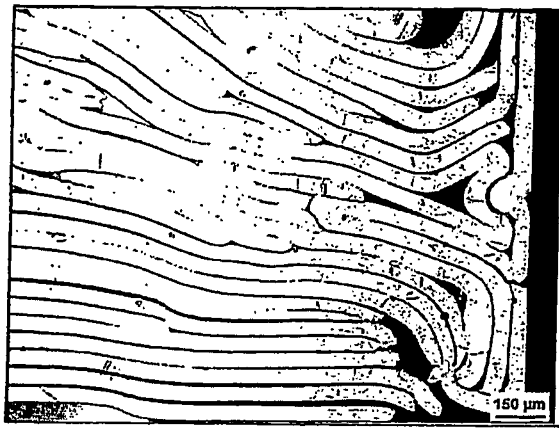
FIG. 1*a* is a SEM analysis of a transverse cut (plane by where the lines of any field are normally crossing through to obtain optimal magnetic properties) of a sintered flaky (or microlamellar) soft magnetic composite according to a first preferred embodiment of the invention, showing typical microstructure of the flaky (microlamellar) material.
Figure 1B:
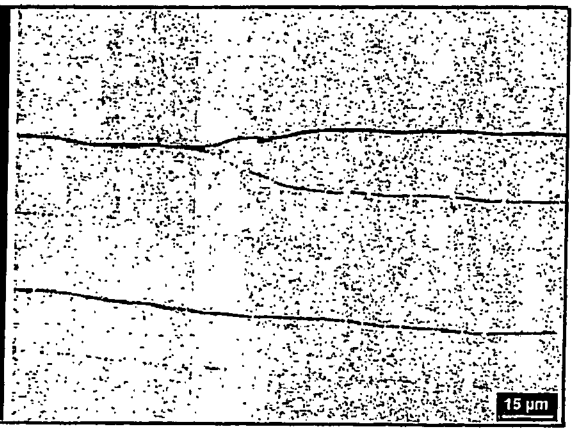
FIG. 1*b* is a SEM analysis of a transverse cut of a forged magnetic composite according to a second preferred embodiment of the invention, shown at higher magnitude to see partial metallic diffusion between particles during sintering.
Figure 4:
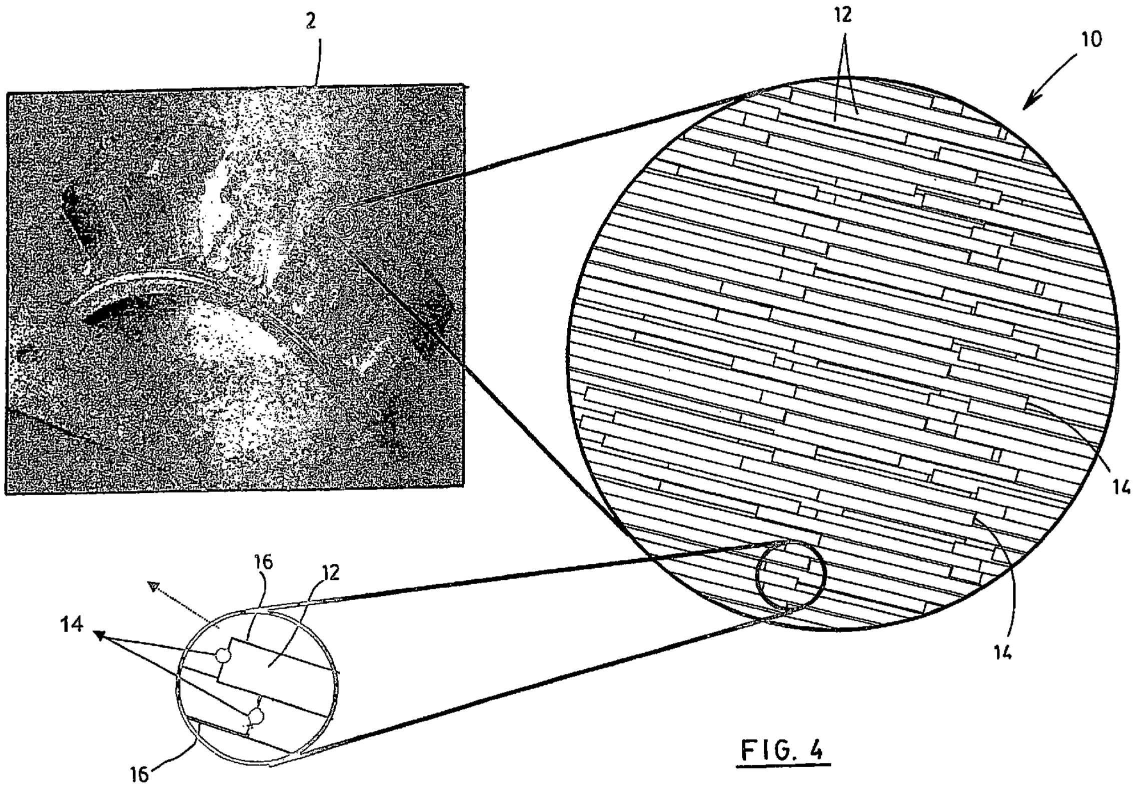
FIG. 4 is a schematic representation of the microstructure of a soft magnetic composite according to the first preferred embodiment of the invention.

Referring to FIGS. 1*a*, 1*b*, or FIG. 4 which shows a typical stator (2) for an AC application that could be made with the composite of the invention, a magnetic composite (10) according to the invention consists of a consolidation of magnetizable metallic microlamellar particles (12) each having a top and bottom surfaces and opposite ends (14). The top and bottom surfaces are coated with a dielectric coating (16) for increasing the resistivity of the composite (10) and reducing eddy current losses. The composite (10) is characterized in that the coating (16) is made of a refractory material and the lamellar particles (12) are metallurgically bonded by their ends (14) to reduce hysteresis losses of the composite (10).

The present invention covers the production process and the material that takes profit of the best properties of the two already existing technologies (i.e. lamination stacking and soft magnetic composite). The material produced with this technology can be fully sintered or forged to achieve good mechanical properties and excellent AC soft magnetic properties at frequencies comprised between 1 and 10 000 Hz. In order to reduce hysteresis losses of the final part, and thus helping to reduce low frequency total losses of the part, the lamellar particles have their ends sintered, or metallurgically bonded, to each other. Losses at low frequencies are as low as for a lamination stacking. Losses at higher frequencies are also low since eddy currents are limited by the use of very thin lamellar particles (0.0005 to 0.002" or 12.5 to 50 μm). Even if electrical insulation is not total between particles, eddy currents are limited to only two or three layers of particles at zone with poor insulations (edges of particles) since, statistically, insulation defects are rarely aligned and are not aligned for more than few layers. The result is a composite material with total losses at frequencies varying between 0 and 400 Hz that are similar to those of a lamination stack made with the best grades of silicon steel (3.5 W/kg at 60 Hz 1.5 T). Mechanical properties of this composite, when forged, are well above all composites previously developed with Transverse Rupture Strength[1] values of 125 000 psi (875 MPa) without plastic deformation followed by a deformation zone (de-lamination) with a stable resistance of 65 000 psi (450 MPa). A composite according to the invention, when only sintered on a reducing atmosphere rather than forged, has TRS value in the same range as that of the best mechanically resistant soft magnetic composite containing a reticulated (cured) resin (18 000 psi, 125 MPa) (Gelinas, C. et al. "Effect of curing conditions on properties of iron-resin materials for low frequency AC magnetic applications", Metal Powder Industries Federation, *Advances in Powder Metallurgy & Particulate Materials*—1998; Volume 2, Parts 5-9 (USA), pp. 8.3-8.11, June 1999). Contrary to previous soft magnetic composites developed, which all have a fragile comportment without any plastic deformation before complete rupture, the sintered or forged composite of the present invention shows a plastic deformation zone like or ductile comportment during mechanical testing. This comportment is due to a slow de-lamination of the composite.

[1] Standard Test Methods, for Metal Powders and Powder Metallurgy Products, MPIF, Princeton, N.J., 1999(MPIF standard #41, Metal Powders Industries Federation, 105 College Road East, Princeton, N.J. 08540-6692 U.S.A)

Extra design liberty given by the process used to make a composite according to the invention (powder metallurgy allows design in three dimensions, lamination stacking is limited in a plane) allows to decrease the total losses of an electromagnetic device made with the composite of the invention (including copper losses) compared to losses generated by the same component made with a lamination stack. Volume and weight can also be decreased importantly with the composite of the invention. As the frequency of the application increases (above 500 Hz), conventional soft magnetic components made with irregular particles, or thin microlamellar particles fully insulated from each other and not sintered, can develop lower total losses due to their better limitation of eddy current losses even if hysteresis losses are higher due to distributed air gap.

DETAILED DESCRIPTION OF A PREFERRED MODE OF REALIZATION

A composite for soft magnetic application (ex: transformers, stator and rotor of motors, generators, alternators, a field concentrator, a synchroresolver, etc . . . ) in accordance with the invention is preferably realized by:

Using pure iron, iron nickel alloys (with nickel content varying from 20 to 85%) which may also contain up to 20% Cr, less than 5% of Mo, less than 5% of Mn; silicon iron with a minimal contain of 80% of iron and with silicon content between 0 and 10%, that may contain less than 10% of Mo, less than 10% of Mn and less than 10% of Cr; iron cobalt alloys with cobalt content varying from 0 to 100% and that may contain less than 10% of Mo, less than 10% of Mn, less than 10% of Cr, and less than 10% of silicon; or finally, Fe—Ni—Co alloys at all content of Ni and Co that may contain a maximum of 20% of other alloying elements.

Using the pre-cited materials (or alloys) in the form of foils of a thickness between 10 μm and 500 μm, preferably under 125 μm, more preferably under 50 μm, coated one or both sides with a very thin electrical insulating inorganic, heat resistant oxide of a thickness between 0.01 μm to 2 μm like silicon, titanium, aluminum, magnesium, zirconium, chromium, boron oxide and their combinations and all other oxides stable over 1000° C. under a reducing atmosphere.

The foil is obtained from a standard hot and cold rolling process starting or not from a strip casting process and including or not some normalizing or full annealing stages during rolling (semi processed electrical steel or silicon steel or fully processed electrical or silicon steel or all other alloys sub-mentioned by rolling) or obtained by casting alloys sub-mentioned on a cooled rotating wheel (melt spinning, planar flow casting, strip casting, melt drag) no matter the width produced. The semi-processed steel or silicon steel could be decarburized prior to receiving the coating or after. A grain coarsening treatment (secondary recristallisation) to achieve optimal magnetic properties could have also been done prior to coating when possible.

The coating is obtained directly by dipping the foil into a liquid aluminum or magnesium bath, by a physical vapor deposition (PVD) or chemical vapor deposition (CVD) process, plasma enhanced or not, or by dipping or spraying using a process such as the sol-gel process or any process, involving the thermal decomposition of an oxide precursor. The CVD, PVD, Magnetron sputtering process could give directly an oxide layer or could give a pure metal coating like with the dipping of the foil into a metal bath. The pure metal coating, in those cases, has to be oxidized during a subsequent process.

Doing a grain coarsening thermal treatment at high temperature under reducing atmosphere on the coated foil to optimize its magnetic properties if the starting foil was not magnetically optimal.

Cutting the pre-cited foil coated and thermally treated or thermally treated and coated in the form of lamellar particles or flakes. Dicing or slitting and cuffing the coated thin foils could give those flakes.

An alternative process gives flakes directly from more spherical powders (produced by another way like water or gaz atomization) by hot or cold rolling the powders or by the melt drag process with a dented wheel (machined with a lot of small grooves) to extract flakes from the melted metal or from an atomization process like rotary electrode or disk where the melted particles hit a wall or a hammer before solidifying. Flakes could be made finally by cutting a ribbon coming from a machining process. In all those last cases, the coating is applied directly on the lamellar particles, rather than on the ribbons to be cut and all edges are coated.

Mixing 0.1 to 1% by weight of lubricant with the pre-cited coated lamellar powders or flakes to help the following pressing process. The lubricant could also be applied by any process directly on the foil prior to its cutting to produce lamellar particles.

Filling at least one pre-filling die with the lamellar particles. The pre-filling die could be sited on a vibrating table during the filling. A magnetic field could also be applied during the filling to orientate the flakes. The pre-filling die could be separated in two or three heights. After a light pressing (0,1 MPa to 10 MPa ), only the third or the two thirds of the initial height of the pre-filling die could be conserved for the powder transfer to the production press. Such pre-pressing is to increase their apparent density, to help the orientation of the flakes perpendicular to the pressing axe and to accelerate subsequent filling of the die of the production press. Sometimes during the filling of the pre-filling operation or after, a pressure in the range of 0,1 MPa to 10 MPa could be applied.

Transferring the powder from the pre-filling die (or one part of its initial height) to the pressing die with the help of a synchronized movement of the upper punch and the lower punch of the press. The upper punch pressure could come from an external temporary punch (the same as the one used for the pre-filling die light compression for example) rather than the punch of the production press. The movement of the lower punch is a common feature during the filling of the press and is commonly named "suction filling".

Pressing the part with the main press with the use of an increase of temperature or not. The consolidation process could be a cold, warm or hot uniaxial process or isostatic process (cold or hot).

Sintering the compacted part to allow the formation of metal to metal contacts. Mechanical and magnetic properties are appreciably increased during the sintering process at a temperature above 1000° C. for at least 5 minutes. An assembling of many different parts could be sintered to obtain a bigger or a more complex rigid part.

Alternatively, rather than sintering, compressed parts could be pre-heated to above 1000° C. and forged to achieve near full density. An assembling of many different parts could be forged simultaneously to give a rigid part.

Alternatively, a repressing could be done on sintered parts to increase density.

A final anneal or another sintering treatment (double press-double sinter process) could be done if a repressing step is done on the parts.

If additional machining operations are required, a final anneal could be done on the parts to obtain the optimum magnetic properties.

Final parts could be dipped into a liquid polymer or metal or alloy to increase their mechanical properties and avoid the detachment of some lamellar particles on the surface of the parts. Any surface treatment could also be done to modify the surface of the parts.

The final part pressed and sintered or forged could be submitted to the following treatments. Those following treatments are given as an example but possible treatments are not limited to those following examples. Final parts could be infiltrated with one or more metals and alloys during a subsequent heat treatment to increase their mechanical properties, wear and corrosion resistance. Parts could also be infiltrated by an organic material to improve mechanical, wear or chemical resistance. Final parts could also be thermal sprayed or be submitted to many other forms of surface treatment.

The metallography of the product combined with its magnetic properties (relative permeability well above 1000) and mechanical properties (transverse rupture strength (MPIF standard 41)) over 18 000 psi (125 MPa) is specific. In fact, metallography of FIG. 1 clearly shows the flaky nature of the composite and the properties reported in table 1 below testify of its sintering or metallurgic bonds between particles. Furthermore, the properties of the part are not modified by heating it in a reducing atmosphere at 1000° C. for 15 minutes, testifying that its mechanical resistance does not come from an organic reticulated resin like for the most mechanically resistant actual soft magnetic composite, and showing that its electrical resistivity, evaluated from the slope of the curve on the graph of its energetic losses as a function of the frequency varying from 10 to 250 Hz in a field of 1 or 1.5 Tesla (FIGS. 2 and 3), is conserved (low eddy current losses) even after a reducing treatment and a beginning of sintering contrarily of all other soft magnetic composites.

Figure 2:
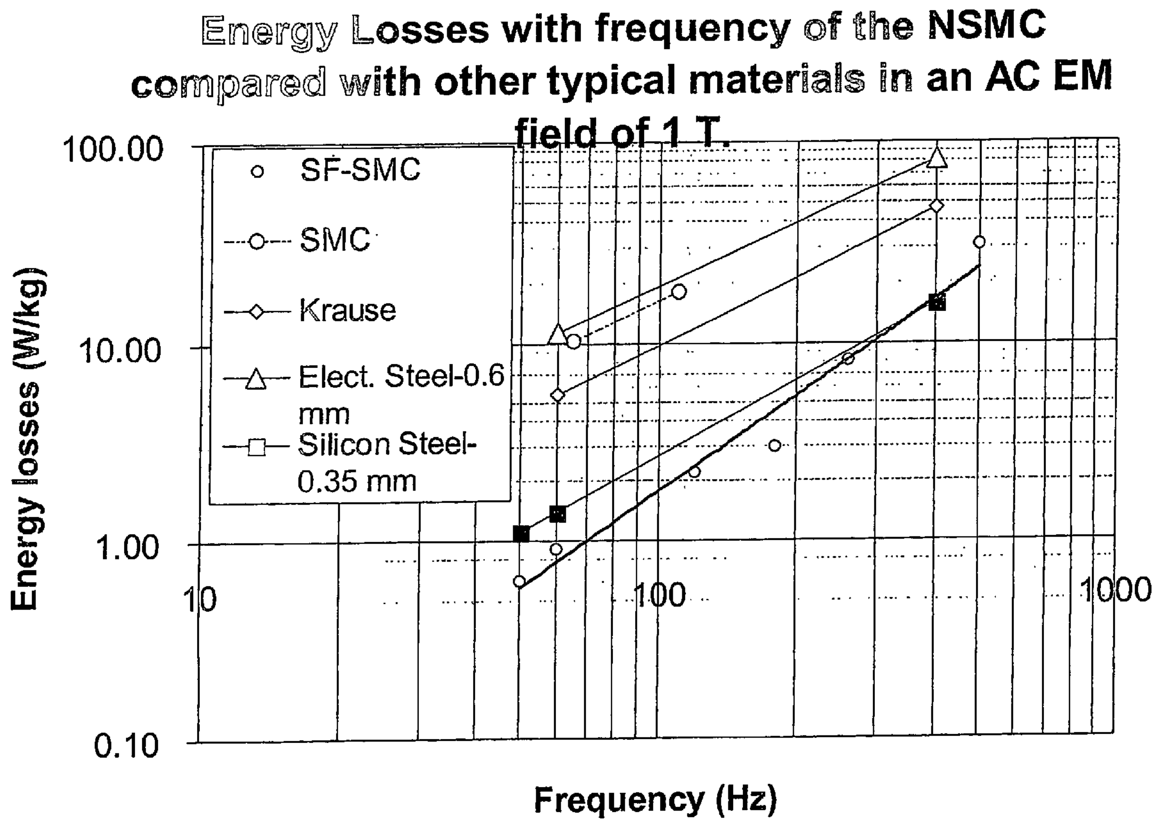
FIGS. 2 and 3 are graphics showing the magnetic properties of a soft magnetic composite according to the invention compared with prior art magnetic materials.
Figure 3:
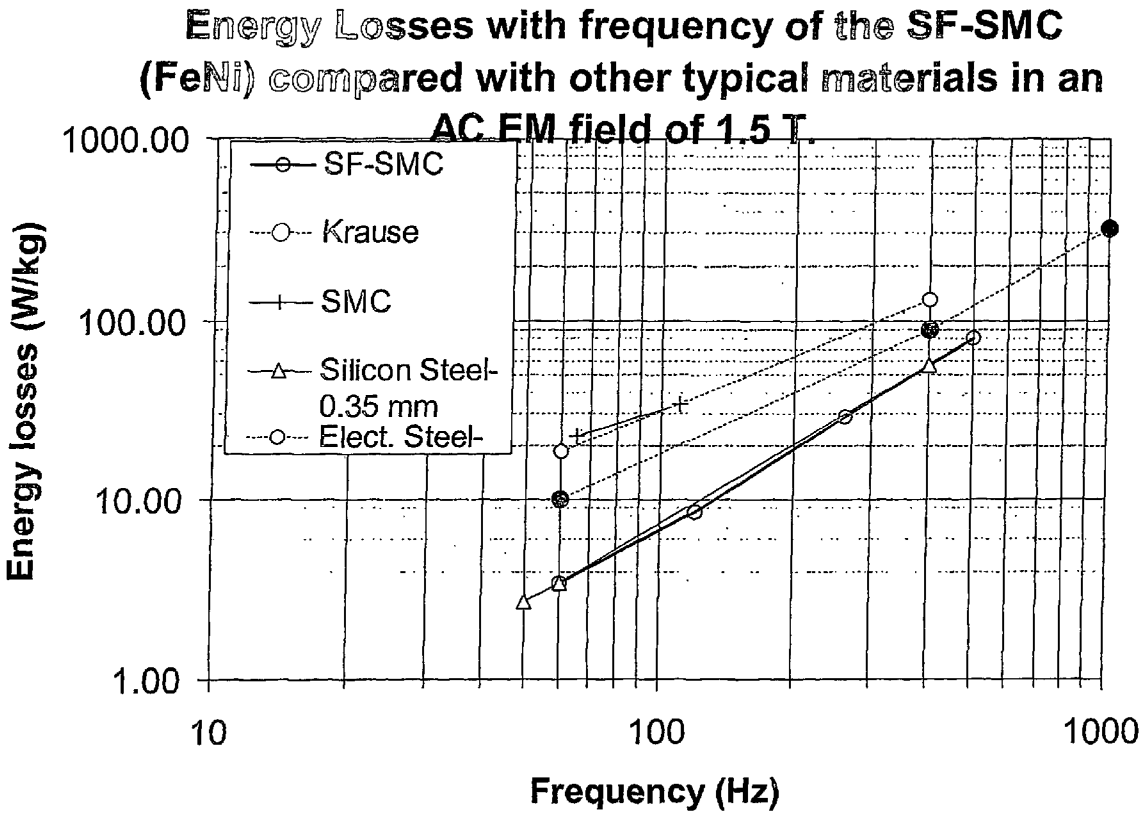

FIGS. 1*a* and 1*b* show examples of the metallography of a sintered microlamellar or flaky soft magnetic composite according to two preferred embodiments of the invention (Sintered Flaky Soft magnetic composite SF-SMC). Table 1 and FIGS. 2 and 3 show typical magnetic properties of the sintered flaky soft magnetic composite.

EXAMPLES

The following properties and energetic losses (FIGS. 1 and 2 and table 1) were measured on standard toroïd specimens of 6 mm (sintered) and 4 mm (forged) thickness for the SF-SMC and results are compared to some common laminations (silicon steel 0.35 mm thick laminations, electrical steel 0.6 mm thick laminations) or soft magnetic composites (SMC and Krause for U.S. Pat. No. 4,265,681) of approximately the same thickness. The new material is identified as "SF-SMC" (Sintered Flaky-Soft Magnetic Composite)

Example 1

The process used to do the rings for which results are reported on table 1 (SF-SMC FeNi sintered) and FIG. 2 at an induction of 1.0 Tesla is the following:

Coating one side of a 50 μm thick Fe-47.5% Ni foil with 0.4 μm of alumina in D.C. pulsed magnetron sputtering reactive process, Annealing the ribbon during 4 hours at 1200° C. under pure hydrogen, Cutting the ribbon to form square lamellar particles of 2 mm by 2 mm sides, Mixing the particles with 0.5% acrawax in a "V" type mixer during 30 minutes, Filling a plastic pre-filling die with the mixture, vibrating the pre-filling die during filling, pressing at 1 MPa, Sliding the content of the pre-filling die into the steel die for cold pressing, pressing at 827 MPa and ejecting the compact, Delubing the compact at 600° C. during 15 minutes, Heating the compact at 1200° C. under pure hydrogen during 30 minutes, and Cooling the compact at 20° C./min.

A part of the same dimensions made with uncoated powders gave 5 times the losses at 60 Hz and 6 times the losses at 260 Hz.

Example 2

The process used to do the rings which results are reported in table 1 (SF-SMC FeNi forged) on FIG. 3 at an induction of 1.5 Tesla is the following:

Coating one side of a 50 μm thick Fe-47.5% Ni foil with 0.4 μm of alumina in D.C. pulsed magnetron sputtering reactive process, Annealing the ribbon during 4 hours at 1200° C. under pure hydrogen, Cutting the ribbon to form square lamellar particles of 2 mm by 2 mm sides, Mixing the particles with 0.5% acrawax in a V type mixer during 30 minutes, Filling a pre-filling die with the mixture, vibrating the pre-filling die during filling, pressing at 1 MPa, Sliding the content of the pre-filling die into the die for cold pressing, pressing at 827 MPa and ejecting the compact, Heating the compact at 1000° C. in air during 3 minutes and forging it at 620 Mpa, Annealing the compact at 800° C. during 30 minutes under pure hydrogen.

A part of the same dimensions made with uncoated laminations gave 6 times the losses at 60 Hz and 8 times the losses at 260 Hz.

Example 3

The process used to do the rings which results are reported on Table 1 (SF-SMC Fe-3%Si sintered) is the following:

Ribbons of iron containing 3% of silicon are produced by the technology of Planar Flow Casting (The melt product is directly poured on a high speed rotating wheel).

The 50 μm thick ribbon is coated with a spray of a Sol-Gel solution made with aluminum isopropoxyde and dried by reaching 150° C. in a continuous process.

The coated ribbon is annealed under pure hydrogen at 1200° C. during 2 hours and cooled to room temperature slowly.

The ribbons are sprayed another time with the Sol-Gel process.

The ribbons are then sprayed with EBS using an electrostatic charging system and cut into 2 mm by 2 mm square particles.

Particles are poured in a plastic pre-compacting die and pre-compacted at 150 lb per square inch (1 MPa).

The pre-compacted particles are transferred to a steel die (powder metallurgy compacting press) and cold pressed at 60 tons per square inch (827 Mpa) of compacting pressure. Compact is ejected.

The compact is then sintered in a conventional sintering furnace including a delubbing zone, a high temperature zone at 1120° C. and a cooling zone. The time at 1120° C. is approximately 10 minutes. The part is cooled approximately at 20° C./min.

Exemple 4

The process used to do the rings which results are reported on Table 1 (SF-SMC Fe-3%Si forged) is the following:

Ribbons of iron containing 3% of silicon are produced by the technology of Planar Flow Casting (The melt product is directly poured on a high speed rotating wheel).

The 50 μm thick ribbon is coated with a spray of a Sol-Gel solution made with aluminum isopropoxyde and dried by reaching 150° C. in a continuous process.

The coated ribbon is annealed under pure hydrogen at 1200° C. during 2 hours and cooled to room temperature slowly.

The ribbons are sprayed another time with the Sol-Gel process.

The ribbons are then sprayed with EBS using an electrostatic charging system and cut into 2 mm by 2 mm square particles.

Particles are poured in a plastic pre-compacting die and pre-compacted at 150 lb per square inch (1 MPa).

The pre-compacted particles are transferred to a steel die (powder metallurgy compacting press) and cold pressed at 60 tons per square inch (827 Mpa) of compacting pressure. Compact is ejected.

Heating the compact at 1000° C. in air during 3 minutes and forging it at 620 MPa.

Annealing the compact at 800° C. during 30 minutes under pure hydrogen.

TABLE 1

Typical D.C. magnetic properties of various soft magnetic materials

| Materials | B max (Tesla) | B at 5000 A/m (Tesla) | μ Max | μ init | Coercive field (A/m) | B r (Tesla) | Elec. Resist. (μohm-cm) |
|---|---|---|---|---|---|---|---|
| SMC | 1.3 | 1.25 | 500 | 150 | 150 | 0.4 | 10 000 |
| SF-SMC (Fe-3% Si) sintered | 1.8 | 1.5 | 3000 | 2500 | 50 | 0.6 | anisotropic |
| SF-SMC (Fe-3% Si) Forged | 1.95 | 1.6 | 5000 | 4000 | 47 | 0.6 | anisotropic |
| SF-SMC (Fe—Ni) sintered | 1.4 | 1.3 | 8000 | 6000 | 12 | 0.2 | anisotropic |
| SF-SMC (Fe—Ni) Forged | 1.55 | 1.5 | 19000 | 17000 | 10 | 0.15 | anisotropic |
| Lamination steel (pure Iron) | 2.2 | 1.7 | 10 000 | 500 | 40 | 0.7 | 10 |
| M19- 0.35 mm or Arnon 5 | 1.95 | 1.65 | 10 000 | 500 | 40 | 0.6 | 55 |

The mechanical testing conducted on the sintered composite also shows that the mechanical properties can reach up to 125 000 psi (875 MPa) when forged and have a minimum of 18 000 psi (124 MPa) after sintering (transverse rupture strength (MPIF standard 41).

Although the present invention has been explained hereinabove by way of a preferred embodiment thereof, it should be understood that the invention is not limited to this precise embodiment and that various changes and modifications may be effected therein without departing from the scope or spirit of the invention.

The invention claimed is:

1. A magnetic composite for AC applications, comprising:

a consolidation of magnetizable metallic microlamellar particles each having top and bottom surfaces and opposite ends, said top and bottom surfaces being coated with a dielectric coating for increasing the resistivity of the composite and reducing eddy current losses, wherein said coating is made of a refractory material and said ends of the micro-lamellar particles are metallurgically bonded to each other to reduce hysteresis losses of the composite.

2. A magnetic composite according to claim 1, that is a soft magnetic composite having a coercive force of less than 500 A/m.

3. A magnetic composite according to claim 1, wherein said coating is made of a material stable at a temperature of at least 1000° C.

4. A magnetic composite according to claim 1, wherein said coating is made of at least one metal oxide.

5. A magnetic composite according to claim 4, wherein said at least one metal oxide is selected from the group consisting of silicon, titanium, aluminum, magnesium, zirconium, chromium, and boron oxide.

6. A magnetic composite according to claim 1, wherein said coating has a thickness in the range of 10 μm or less.

7. A magnetic composite according to claim 1, wherein the microlamellar particles are of a metallic material containing at least one of Fe, Ni and CO.

8. A magnetic composite according to, claim 1 wherein the microlamellar particles are made of a material selected from the group consisting of pure iron, iron alloys, pure nickel, nickel alloys, iron-nickel alloys, pure cobalt, cobalt alloys, iron-cobalt alloys and iron-nickel-cobalt alloys.

9. A magnetic composite according to claim 1, wherein said microlamellar particles have a thickness (e) in the range of 15 to 150 μm.

10. A magnetic composite according to claim 1, wherein said microlamellar particles have a length-to-thickness ratio greater than 3 and lower than 200.

11. A magnetic composite according to claim 1, wherein the metallurgically bonded ends are obtained by heating said consolidation of particles to a temperature of at least 800° C.

12. A magnetic composite according to claim 1, wherein the metallurgically bonded ends are obtained by heating said consolidation of particles to a temperature above 1000° C.

13. A magnetic composite according to claim 1, wherein the metallurgically bonded ends are obtained by forging said consolidation.

14. A magnetic composite according to claim 1, having an energy loss when tested according to the ASTM standard A773, A927 for a toroïd of at least 4 mm thickness in an AC electromagnetic field of 1 Tesla and a frequency of 60 Hz of less than 2 W/kg.

15. A magnetic composite according to claim 1, that has a coercive force of less than 100 A/m.

16. A magnetic composite according to claim 1, that has a coercive force of less than 50 A/m.

17. A magnetic composite according to claim 1, that has a coercive force of less than 25 A/m.

18. A magnetic composite according to claim 1, that has a DC magnetic permeability of at least 1000.

19. A magnetic composite according to claim 1, that has a DC magnetic permeability of at least 2500.

20. A magnetic composite according to claim 1, that has a DC magnetic permeability of at least 5000.

21. A magnetic composite according to claim 1, that has a transverse rupture strength of at least 125 MPa.

22. A magnetic composite according to claim 1, that has a transverse rupture strength of at least 500 MPa.

23. A magnetic composite according to claim 1, that shows a plastic deformation zone during mechanical testing.

24. A process of manufacturing a magnetic composite comprising the steps of:

a) providing microlamellar particles made of a magnetizable metallic material, said particles having opposite ends and a top and bottom surfaces, said top and bottom surfaces being coated with a dielectric and refractory coating;

b) compacting said microlamellar particles into a predetermined shape for obtaining a consolidation of said microlamellar particles; and c) metallurgically bonding the ends of said microlamellar particles to each other.

25. A process according to claim 24, characterized in that step c) of metallurgically bonding comprises the step of:

heating said consolidation at a temperature sufficient to sinter said ends.

26. A process according to claim 25, wherein the temperature sufficient to sinter is at least 800° C.

27. A process according to claim 25, wherein the temperature sufficient to sinter is at least 1000° C.

28. A process according to claim 24, wherein step c) of metallurgically bonding comprises the step of forging said consolidation.

29. A process according to claim 24, wherein step a) comprises the steps of:

a1) providing a foil of said magnetizable material having a thickness of less than about 150 μm, said foil having a top and bottom surfaces coated with said dielectric and refractory coating; and a2) cutting said microlamellar particles from said foil.

30. A process according to claim 29, wherein, prior to step a1) of providing a foil, the step of coating said top and bottom surfaces of the foil, said coating being selected from the following group consisting of a physical vapor deposition, a chemical vapor deposition, plasma deposition, a thermal decomposition of a dip or spray deposited oxide precursor and a surface reaction process so as to obtain a coating having a thickness of less than 2 μm.

31. A process according to claim 29, wherein the step of thermally treating the foil to relieve stresses and coarsen grains of the foil.

32. A process according to claim 24, wherein step b) of compacting is selected from the group consisting of uniaxial pressing, and cold or hot isostatic pressing.

33. A process according to claim 32, wherein step b) of compacting consists of a uniaxial pressing comprising the step of:

b1) filling a pressing die with said particles; and b2) pressing said particles to obtain said consolidation of particles.

34. A process according to claim 33, wherein, prior to step b1) of filling, the steps of:

filling a pre-filling die with said particles;

pre-pressing said particles to increase the density of the mass; and transferring the pre-pressed particles to the pressing die of step b1).

35. A process according to claim 34, wherein, prior to the pre-filling step, the step of lubricating the particles and/or the die cavity.

36. A process according to claim 34, wherein a pressure in the range of 0,1 MPa to 10 MPa is applied for the pre-pressing step.

37. A process according to claim 33, wherein a 2 pressure in the range of 300 MPa to 1000 MPa is applied in step b2) of pressing.

38. A magnetic composite obtained by a process according to claim 24.

* * * * *